(12) United States Patent
Wen et al.

(10) Patent No.: US 7,529,761 B2
(45) Date of Patent: May 5, 2009

(54) TWO-DIMENSIONAL CONDITIONAL RANDOM FIELDS FOR WEB EXTRACTION

(75) Inventors: Ji-Rong Wen, Beijing (CN); Wei-Ying Ma, Beijing (CN); Zaiqing Nie, Beijing (CN); Jun Zhu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 277 days.

(21) Appl. No.: 11/304,500

(22) Filed: Dec. 14, 2005

(65) Prior Publication Data

US 2007/0150486 A1 Jun. 28, 2007

(51) Int. Cl.
G06F 17/00 (2006.01)

(52) U.S. Cl. .................................... 707/101; 707/104.1

(58) Field of Classification Search .................. 707/101
See application file for complete search history.

(56) References Cited

U.S. PATENT DOCUMENTS

| | | | |
|---|---|---|---|
| 6,304,864 B1 | 10/2001 | Liddy et al. | |
| 6,353,825 B1 | 3/2002 | Ponte | |
| 6,418,434 B1 | 7/2002 | Johnson et al. | |
| 6,418,448 B1 | 7/2002 | Sarkar | |
| 6,631,369 B1 | 10/2003 | Meyerzon et al. | |
| 6,665,665 B1 | 12/2003 | Ponte | |
| 6,996,778 B2 | 2/2006 | Rajarajan et al. | |
| 7,058,913 B1 | 6/2006 | Siegel et al. | |
| 7,231,395 B2 | 6/2007 | Fain et al. | |
| 2004/0034652 A1 | 2/2004 | Hofmann et al. | |
| 2004/0181749 A1* | 9/2004 | Chellapilla et al. | 715/505 |
| 2005/0108200 A1 | 5/2005 | Meik et al. | |
| 2006/0031211 A1 | 2/2006 | Mizuno | |
| 2006/0074881 A1 | 4/2006 | Vembu et al. | |
| 2006/0080353 A1 | 4/2006 | Miloushev et al. | |
| 2006/0098871 A1* | 5/2006 | Szummer | 382/173 |
| 2006/0101060 A1 | 5/2006 | Li et al. | |

(Continued)

FOREIGN PATENT DOCUMENTS

WO    WO 00/57311    9/2000

(Continued)

OTHER PUBLICATIONS

Xuming He, Multiscale Conditional Random Fields for Image Labeling, 2004, Proceesings of the 2004 IEEE Computer Society Conference on Computer Vision and Pattern Recognition, 1063-6919/04.*

(Continued)

Primary Examiner—John E Breene
Assistant Examiner—Thu-Nguyet Le
(74) Attorney, Agent, or Firm—Perkins Coie LLP

(57) ABSTRACT

A labeling system uses a two-dimensional conditional random fields technique to label the object elements. The labeling system represents transition features and state features that depend on object elements that are adjacent in two dimensions. The labeling system represents the grid as a graph of vertices and edges with a vertex representing an object element and an edge representing a relationship between the object elements. The labeling system represents each diagonal of the graph as a sequence of states. The labeling system selects a labeling for the vertices of the diagonals that has the highest probability based on transition probabilities between vertices of adjacent diagonals and on the state probabilities of a position within a diagonal.

9 Claims, 8 Drawing Sheets

U.S. PATENT DOCUMENTS

2006/0167928 A1 7/2006 Chakraborty et al.
2006/0253437 A1 11/2006 Fain et al.
2007/0150486 A1 6/2007 Wen et al.
2008/0027910 A1 1/2008 Wen et al.

FOREIGN PATENT DOCUMENTS

WO        WO 00/73942 A2    12/2000

OTHER PUBLICATIONS

David Pinto, Table Extraction Using Conditional Random Fields, SIGIR'03 Jul. 28-Aug. 1, CopyRight 2003 ACM.*
Song et al. ("Learning Block Importance Models for Web Pages", Copyright is held by the author/owners, www 2004, New York, NY USA. ACM Apr. 2005).*
Sutton et al. (Dynamic Conditional Random Fields: Factorized Probabilistic Models for Labeling and Segmenting Sequence Data, the 21st International Conference on Machine Learning, 2004).*
U.S. Appl. No. 11/459,857, filed Jul. 25, 2006, Wen et al.
U.S. Appl. No. 11/461,400, filed Jul. 31, 2006, Wen et al.
Arasu, Arvind and Hector Garcia-Molina, "Extracting Structured Data from Web Pages," SIGMOD 2003, San Diego, © 2003 ACM, 12 pages.
Arlotta, Luigi et al, "Automatic Annotation of Data Extracted from Large Web Sites," International Workshop on the Web and Databases, Jun. 2003, San Diego, 6 pages.
Balmin, Andrey, Vagelis Hristidis and Yannis Papakonstantinou, "ObjectRank: Authority-Based Keyword Search in Databases," Proceedings of the 30th VLDB Conference, Toronto, Canada, 2004, 12 pages.
Berger, Adam L., Stephen A. Della Pietra and Vincent J. Della Pietra, "A Maximum Entropy Approach to Natural Language Processing," Computational Linguistics, vol. 22, No. 1.
Besag, Julian, "Spatial Interaction and the Statistical Analysis of Lattice Systems," Journal of the Royal Statistical Society, Series B, vol. 36, No. 36, No. 2, 1974, pp. 192-236.
Bunescu, Razvan C. and Raymond J. Mooney, "Relational Markov Networks for Collective Information Extraction," Proceedings of the ICML 2004 Workshop on Statistical Relational Learning and its Connections to Other Fields (SLR-2004), Banff, Canada, Jul. 2004, 7 pages.
Buttler, David, Ling Liu and Calton Pu, "A Fully Automated Object Extraction System for the World Wide Web," Proceedings of IEEE ICDCS-21, 2001, 11 pages.
Cai, Deng et al., "VIPS: a Vision-based Page Segmentation Algorithm," Nov. 1, 2003, Microsoft Technicial Report MSR-TR-2003-79, pp. 1-29.
Cai, Deng, Shipeng Yu, Ji-Rong Wen and Wei-Ying Ma, "Block-based Web Search," SIGIR'04, Sheffield, South Yorkshire, UK, © 2004 ACM, 8 pages.
Chang, Chia-Hui and Shao-Chen Lui, "IEPAD: Information Extraction Based on Pattern Discovery," WWW10, May, Hong Kong, © 2001 ACM, pp. 681-688.
Clarke, Charles L. A., "Controlling Overlap in Content-Oriented XML Retrieval," SIGIR'05, Salvador, Brazil, © 2005 ACM, 8 pages.
Collins, Michael, "Discriminative Training Methods for Hidden Markov Models: Theory and Experiments with Perceptron Algorithms," 2002, 8 pages.
Collins, Michael, "Ranking Algorithms for Named-Entity Extraction: Boosting and the Voted Perceptron," Proceedings of the 40th Annual Meeting of the Association for Computational Linguistics, Philadelphia, Jul. 2002, pp. 489.496.
Crescenzi, Valter, Giansalvatore Mecca and Paolo Merialdo,"RoadRunner: Towards Automatic Data Extraction from Large Web Site," Proceedings of the 27th VLDB Conference, Italy, 2001, 10 pages.
Embley, D.W., Y.S. Jian and Y.-K. Ng, "Record-Boundary Discovery in Web Documents," In Proceedings of SIGMOD'99, 1999, pp. 1-24.
Fagin, Ronald et al., "Searching the Workplace Web," WWW 2003, Budapest, Hungary, ACM, 10 pages.

Fine, Shai, Yoram Singer and Naftali Tishby, "The Hierarchical Hidden Markov Model: Analysis and Applications," Machine Learning, vol. 32, 1998, © 1998 Kluwer Academic Publishers, pp. 41-62.
Freitag, Dayne and Andrew Kachites McCallum, "Information Extraction with HMMs and Shrinkage," In Proceedings of the AAAI-99 Workshop on Machine Learning for Information Extraction, 1999, 6 pages.
Gravano, Luis and Hector Garcia-Molina, "Generalizing GLOSS to Vector-Space Databases and Broker Hierachies," Proceedings of the 21st VLDB Conference, Zurich, Switzerland, 1995, 12 pages.
He, Xuming et al., "Multiscale Conditional Random Fields for Image Labeling," Proceedings of the 2004 IEEE Computer Society Conference on Computer Vision and Pattern Recognition, pp. 1-8.
Jensen, F. V., S. L. Lauritzen and K. G. Olesen, "Bayesian Updating in Causal Probabilistic Networks by Local Computations," Comptational Statistics Quarterly 4, 1990, © Physica-Verlag, pp. 269-282.
Kamps, Jaap et al., "Length Normalization in XML Retrieval," SIGIR'04, Sheffield, South Yorkshire, UK © 2004 ACM, 8 pages.
Kobayashi, Mei and Koichi Takeda, "Information Retrieval on the Web," ACM Computing Surveys, vol. 32, No. 2, Jun. 2000, pp. 144-173.
Kschischang, Frank R., Brendan J. Frey and Hans-Andrea Loeliger, "Factor Graphs and the Sum-Product Algorithm," IEEE Transactions on Information Theory, vol. 47, No. 2, Feb. 2001, © 2001 IEEE, pp. 498-519.
Kumar, Sanjiv and Martial Hebert, "Discriminative Fields for Modeling Spatial Dependencies in Natural Images," Advances in Neural Information Processing Systems, NIPS 16, 2004, 8 pages.
Kumar, Sanjiv and Martial Hebert, "Discriminative Random Fields: Discriminative Framework for Contextual Interaction in Classification," Proceedings of the 2003 IEEE International Conference on Computer Vision, vol. 2, 2003, 8 pages.
Kushmerick, Nicholas, "Wrapper induction: Efficiency and expressiveness," Mar. 10, 1999, Artificial Intelligence 118, 2000, © 2000 Elsevier Science B.V., pp. 15-68.
Laender, Alberto et al., "A Brief Survey of Web Data Extraction Tools," ACM SIGMOD Record, 31 (2), 2002, 10 pages.
Lafferty, John, Andrew McCallum and Fernando Pereira, "Conditional Random Fields: Probabilistic Models for Segmenting and Labeling Sequence Data," In Proceedings of ICML 2001, 8 pages.
Lalmas, Mounia, "Dempster-Shafer's Theory of Evidence applied to Structured Documents: modelling Uncertainty," SIGIR 1997, Philadelphia, Pennsylvania, © 1997 ACM, pp. 110-118.
Leek, Timothy Robert, "Information Extraction Using Hidden Markov Models," University of California, San Diego Computer Science Thesis Paper, 1997, 44 pages.
Lerman, Kristina et al., "Using the Structure of Web Sites for Automatic Segmentation of Tables," SIGMOD 2004, Paris, © 2004 ACM, 12 pages.
Lerman, Kristina, Steven N. Minton and Craig A. Knoblock, "Wrapper Maintenance: A Machine Learning Approach," Journal of Artificial Intelligence Research 18, 2003, © 2003 AI Access Foundation and Morgan Kaufmann Publishers, pp. 149-181.
Li, Jia, Amir Najmi and Robert M. Gray, "Image Classification by a Two-Dimensional Hidden Markov Model," July 4, 1999, IEEE Transactions on Signal Processing, vol. 48, No. 2, Feb. 2000, © 2000 IEEE, pp. 517-533.
Libra. An Object-level Academic Search Engine, Microsoft Research Asia, 2006 http://libra.directtaps.net [last accessed Nov. 13, 2006].
Liu, Bing and Yanhong Zhai, "NET—A System for Extracting Web Data from Flat and Nested Data Records," Proceedings of 6th International Conference on Web Information System Engineering (WISE-05), 2005, 8 pages.
Lui, Bing, Robert Grossman & Yanhong Zhai, "Mining Data Records in Web Pages," SIGKDD'03, Washington, DC, © 2003 ACM, pp. 601-606.
Liu, Dong C. and Jorge Nocedal, "On the Limited Memory BFGS Method for Large Scale Optimization," Appeared in Mathematical Programming 45, 1989, pp. 503-528.
Malouf, Robert, "A comparison of algorithms for maximum entropy parameter estimation," In Proceedings of the 6th Conference on Natural Language Learning 2002, pp. 49-55.

Marchiori, Massimo, "The limits of Web metadata, and beyond," The World Wide Web Consortium, MIT Laboratory for Computer Science, 1998, 9 pages.

McCallum, Andrew, Dayne Freitag and Fernando Pereira, "Maximum Entropy Markov Models for Information Extraction and Segmentation," Proc. ICML 2000, pp. 591-598.

Muslea, Ion, Steven Minton and Craig A. Knoblock, "Hierarchical Wrapper Induction for Semistructured Information Sources," Sep. 10, 1999, © 1999 Kluwer Academic Publishers, pp. 1-28.

Nie, Zaiqing et al, "Object-Level Ranking: Bringing Order to Web Objects," WWW 2005, Chiba, Japan, 8 pages.

Ogilvie, Paul and Jamie Callan, "Combining Document Representations for Known-Item Search," SIGIR'03, Toronto, Canada, © 2003 ACM, pp. 143-150.

Peng, Fuchun and Andrew McCallum, "Accurate Information Extraction from Research Papers using Conditional Random Fields," 2004, Proceedings of Human Language Technology Conference and North American Chapter of the Association for Computational Linguistics, 8 pages.

Ratnaparkhi, Adwait, "A Maximum Entropy Model for Part-Of-Speech Tagging," University of Pennsylvania, Dept. of Computer and Information Science, pp. 133-142.

Robertson, Stephen, Hugo Zaragoza and Michael Taylor, "Simple BM25 Extension to Multiple Weighted Fields," CIKM'04, Washington DC, © 2004 ACM, pp. ACM, pp. 42-49.

Sha, Fei and Fernando Pereira, "Shallow Parsing with Conditional Random Fields," Proceedings of Human Language Technology, NAACL 2003, 8 pages.

Skounakis, Marios, Mark Craven and Soumya Ray, "Hierarchical Hidden Markov Models for Information Extraction," Proceedings of the 18th International Joint Conference on Artificial Intelligence, Acapulco, Mexico, Morgan Kaufmann, 2003, 7 pages.

Song, Ruihua et al., "Learning Block Importance Models for Web Pages," WWW 2004, New York, pp. 203-211.

Sutton, Charles, Khashayar Rohanimanesh and Andrew McCallum, "Dynamic Conditional Random Fields: Factorized Probabilistic Models for Labeling and Segmenting Sequence Data," Proceedings of the 21st International Conference on Machine Learning, Banff, Canada, 2004, 8 pages.

Taskar, Ben, Pieter Abbeel and Daphne Koller, "Discriminative Probabilistic Models for Relational Data," In Proceedings of the 18th Conference on Uncertainty in Artificial Intelligence, 2002, 8 pages.

Tejeda, Sheila et al., "Learning Domain-Independent String Transformation Weights for High Accuracy Object Identification," SIGKDD'02, Edmonton, Alberta, Canada, © 2002 ACM, 10 pages.

Wang, Jiying and Frederick H. Lochovsky, "Data Extraction and Label Assignment for Web Databases," WWW 2003, Budapest, Hungary, ACM, pp. 187-196.

Westerveld, Thijs et al., "Retrieving Web Pages Using Content, Links, URLs and Anchors," University of Twente, The Netherlands, 2001, 10 pages.

Wilkinson, Ross, "Effective Retrieval of Structured Documents," SIGIR 1994, pp. 311-317.

Xu, Jinxi and Jamie Callan, "Effective Retrieval with Distributed Collections," SIGIR'98, Melbourne, Australia, © 1998 ACM, 9 pages.

Yi, Lan, Bing Liu and Xiaoli Li, "Eliminating Noisy Information in Web Pages for Data Mining," SIGKDD'03, Washington D.C., © 2003 ACM, 10 pages.

Yu, Shipeng et al., "Improving Pseudo-Relevance Feedback in Web Information Retrieval Using Web Page Segmentation," WWW 2003, Hungary, ACM, 8 pages.

Yu, Stella X., Tai Sing Lee and Takeo Kanade, "A Hierarchical Markov Random Field Model for Figure-Ground Segregation," EMMCVPR 2001, © Springer-Verlag Berlin Heidelberg 2001, pp. 118-133.

Zhai, Yanhong and Bing Liu, "Web Data Extraction Based on Partial Tree Alignment," WWW 2005, Chiba, Japan, May 2005, 10 pages.

Zhao, Hongkun et al., "Fully Automatic Wrapper Generation For Search Engines," WWW 2005, Chiba, Japan, ACM, 10 pages.

Zhu, Jun et al., "2D Conditional Random Fields for Web Information Extraction," Proceedings of the 22nd International Conference on Machine Learning, Germany, 2005, 8 pages.

* cited by examiner

TWO-DIMENSIONAL CONDITIONAL RANDOM FIELDS FOR WEB EXTRACTION

BACKGROUND

Web pages accessible via the Internet contain a vast amount of information. A web page may contain information about various types of objects such as products, people, papers, organizations, and so on. For example, one web page may contain a product review of a certain model of camera, and another web page may contain an advertisement offering to sell that model of camera at a certain price. As another example, one web page may contain a journal article, and another web page may be the homepage of an author of the journal article. A person who is searching for information about an object may need information that is contained in different web pages. For example, a person who is interested in purchasing a certain camera may want to read reviews of the camera and to determine who is offering the camera at the lowest price.

To obtain such information, a person would typically use a search engine to find web pages that contain information about the camera. The person would enter a search query that may include the manufacturer and model number of the camera. The search engine then identifies web pages that match the search query and presents those web pages to the user in an order that is based on how relevant the content of the web page is to the search query. The person would then need to view the various web pages to find the desired information. For example, the person may first try to find web pages that contain reviews of the camera. After reading the reviews, the person may then try to locate a web page that contains an advertisement for the camera at the lowest price.

The person viewing the web pages would typically like to know whether the web pages contain information for the same object. For example, a person would like to know whether a certain product review and a certain product advertisement are for the same object. In the example of a camera, a person would like to know which reviews and products are for the camera of interest. It can, however, be difficult for the person viewing the web pages to determine whether a review and an advertisement are for the same product. In many cases, a web page does not include a unique identifier for the product for which it is providing information. For example, a product review may identify the manufacturer and model of a camera, but not a sub-model number, and an advertisement may identify the manufacturer, but only include a general description of the camera. A person viewing the product review and the advertisement may not be able to ascertain whether they are for the same camera.

SUMMARY

A labeling system uses a two-dimensional conditional random fields ("CRF") technique to label the object elements. The labeling system represents transition features and state features that depend on object elements that are adjacent in two dimensions. The labeling system divides a web object into a two-dimensional grid of object elements. The labeling system represents the grid as a graph of vertices and edges with a vertex representing an object element and an edge representing a relationship between the object elements. The labeling system represents each diagonal of the graph as a sequence of states. The labeling system selects a labeling for all the vertices of the graph that has the highest probability. The labeling system calculates the most probable labeling using the transition matrices between adjacent diagonals. The labeling system calculates each entry of the transition matrices using transition feature functions and state feature functions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for labeling object information of an information page is provided. In one embodiment, a labeling system receives the identification of the object blocks of an information page. An object block is a collection of information that relates to a single object. For example, an advertisement for a camera may be an object block and the object is a uniquely identified camera. The object blocks may be classified into object types. For example, an object block that advertises a camera may be classified as a product type, and an object block relating to a journal paper may be classified as a paper type. Each object type has associated attributes. For example, a product type may have attributes of manufacturer, model, price, description, and so on. A paper type may have attributes of title, author, publisher, and so on. The labeling system identifies object elements within an object block that may represent an attribute value for the object. For example, the object elements of an advertisement of a camera may include manufacturer, model, and price. The labeling system may use visual features (e.g., font size and separating lines) of an information page to help identify the object elements. After the object elements are identified, the labeling system attempts to identify which object elements correspond to which attributes of the object type in a process referred to as "labeling." For example, the labeling system may identify that the object element "Sony" is a manufacturer attribute and the object element "$599" is a price attribute.

Figure 1:
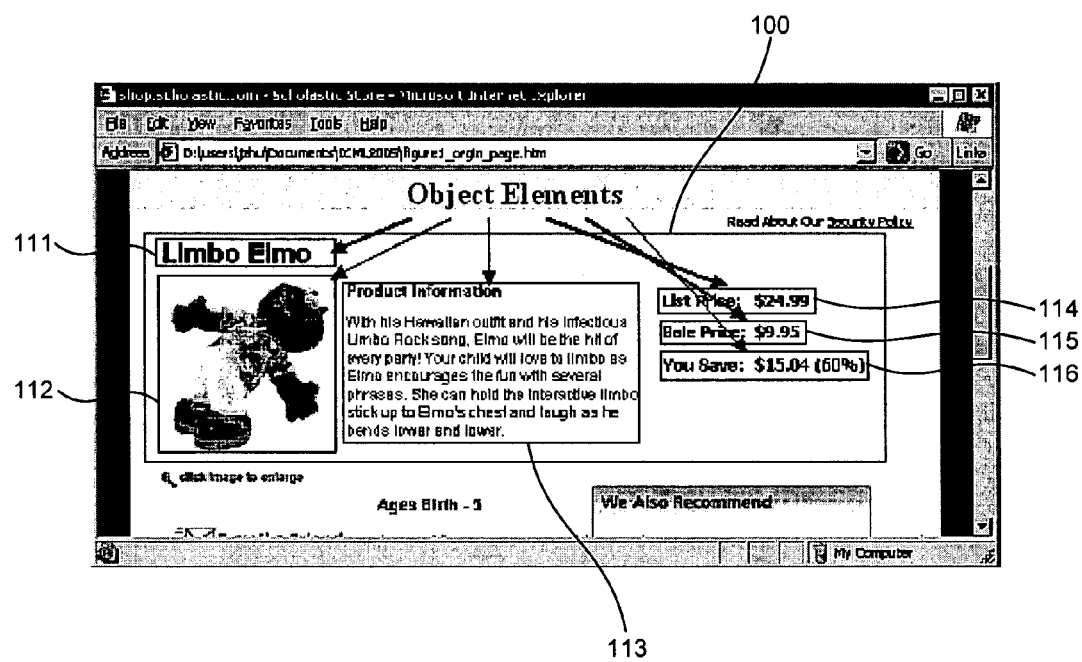
FIG. 1 illustrates a web object representing a doll having object elements.

In one embodiment, the labeling system uses a two-dimensional conditional random fields ("CRF") technique to label the object elements. Traditional conditional random fields techniques are one-dimensional or linear-chain in the sense that they label a linear sequence of observations based on the labels themselves and the interactions of adjacent labels in the sequence of labels. Thus, traditional CRF techniques only represent the relationships between adjacent observations. The object elements (i.e., observations) of web objects typically have a complex interrelationship that might not be effectively represented by the traditional CRF techniques. FIG. 1 illustrates a web object representing a doll having object elements. The web object 100 contains six object elements: name, image, description, and three price elements. Traditional CRF techniques would convert the object elements to a sequence of object elements and then assign labels. The converting of object elements to a sequence results in the loss of information represented by the two-dimensional layout of the web object. For example, a sequencing of the object elements as 111, 112, 113, 114, 115, and 116 will lose the information that object elements 115 and 116 are adjacent to object element 113, which may be helpful in labeling object elements 115 and 116. The labeling system uses a two-dimensional CRF technique to represent transition features and state features that depend on object elements that are adjacent in two dimensions. Although described in the context of labeling object elements of a web object, the two-dimensional CRF technique can be used in any environment for the labeling of observations that have a two-dimensional relationship.

In one embodiment, the labeling system divides a web object into a two-dimensional grid of object elements. The labeling system represents the grid as a graph of vertices and edges with a vertex representing an object element and an edge representing a relationship between the object elements. The labeling system represents each diagonal of the graph as a sequence of states. The labeling system selects a labeling for all the vertices of the graph that has the highest probability. This most probable labeling can be efficiently calculated using the transition matrices between adjacent diagonals. Each entry of the transition matrices is calculated using transition feature functions and state feature functions. Since not all object elements are the same size as a grid position, the labeling system compensates for object elements that span multiple positions. For example, if a 4-by-3 grid is used to represent object 100, then object element 113 may span three rows (e.g., positions) that include object elements 114, 115, and 116. The labeling system uses a real state and one or more virtual states to represent the positions spanned by an object element. The labeling system performs the labeling with the constraint that a real state and its corresponding virtual states have the same label. In this way, the labeling system can automatically identify information of an object.

Figure 2:
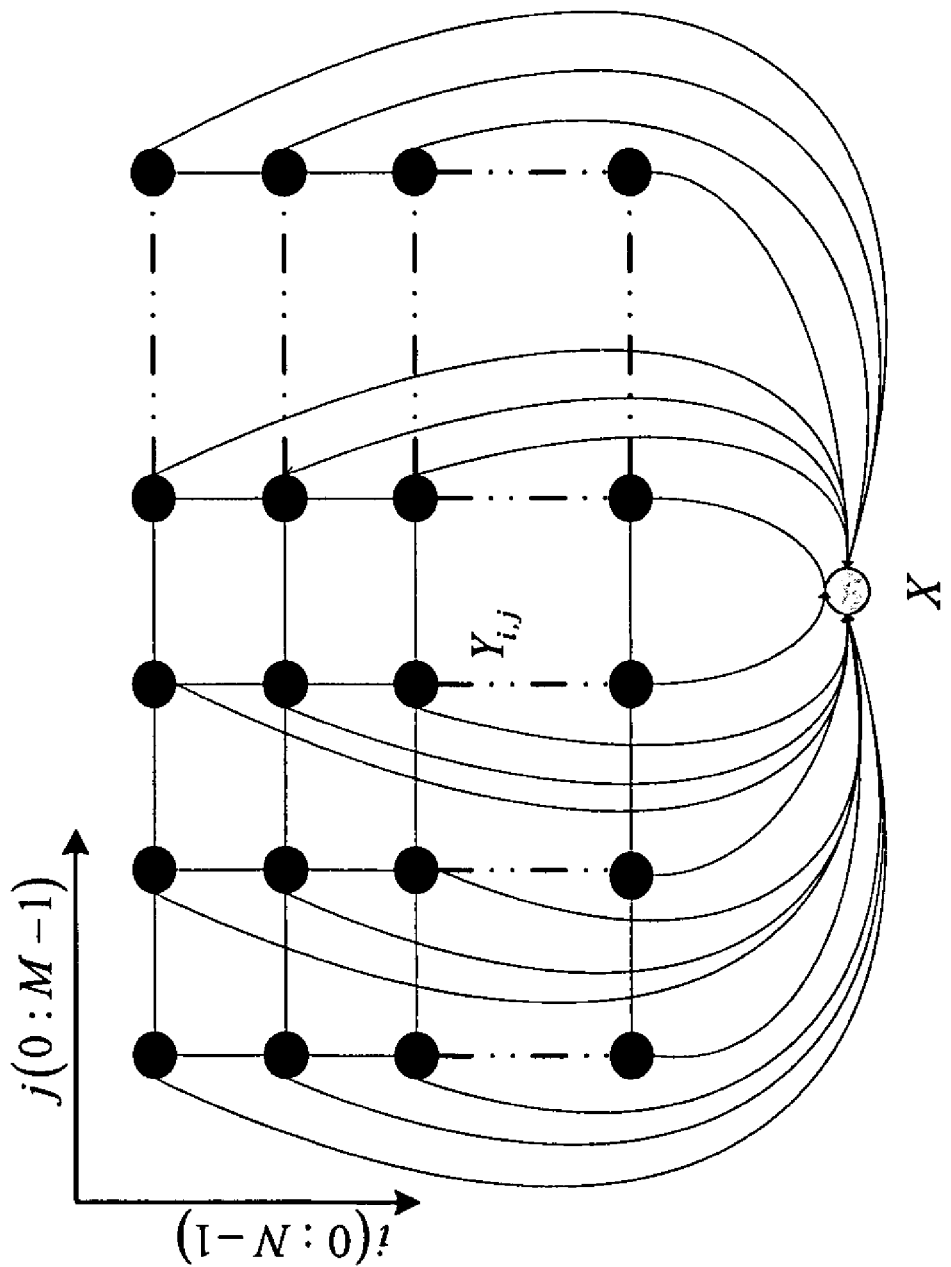
FIG. 2 illustrates the graphical structure of a two-dimensional CRF technique.
Figure 3:
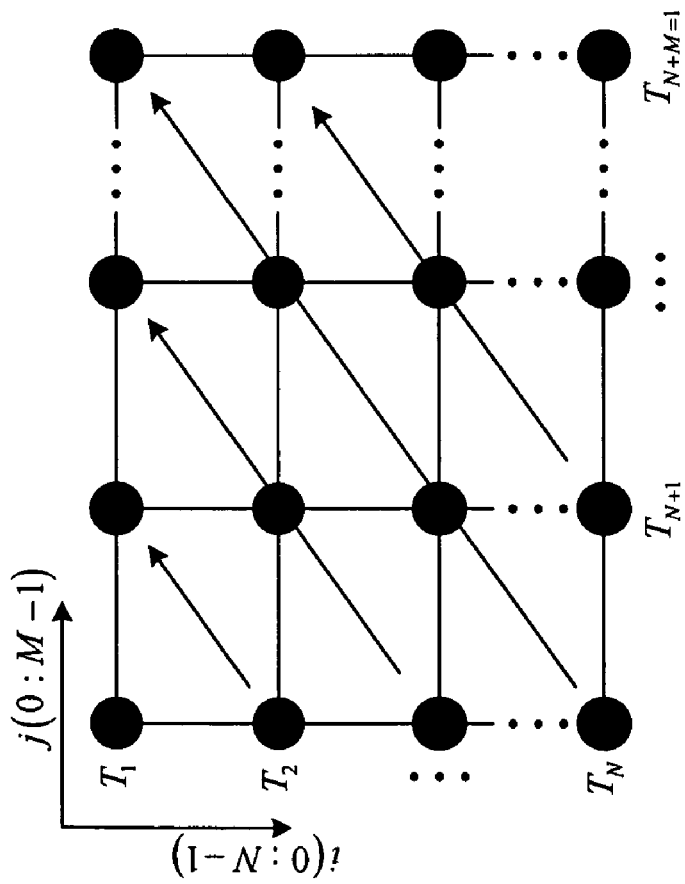
FIG. 3 illustrates the diagonals of the graphical structure.

The labeling system represents the random variable over observations as X and denotes the random variable over the corresponding labels as Y. Thus, $Y_{i,j}$ is a component of Y at the vertex (i,j). FIG. 2 illustrates the graphical structure of a two-dimensional CRF technique. The labeling system uses a two-dimensional CRF technique to determine the labels for observations. The labeling system assumes labels for an observation are related to the labels for the observations in the two-dimensional neighborhood. FIG. 3 illustrates the diagonals of the graphical structure. The labeling system uses the following terminology:

1) The state sequence on diagonal d ($1 \leq d \leq M+N-1$), $\{y_{d-1,0}, y_{d-2,1}, \ldots, y_{0,d-1}\}$ is denoted by $T_d$.
2) Two special state sequences are added: $T_0$=start and $T_{N+M}$=stop.
3) The diagonal on which the random variable $Y_{i,j}$ lies is denoted by $\Delta(i,j)$.
4) The set of coordinates of the random variables on diagonal d, $\{(i,j), \Delta(i,j)=d\}$ is denoted by I(d).
5) The set of edges between diagonals d−1 and d $\{((i,j),(i,j)) \in E:(i,j) \in I(d-1) \text{ and } (i,j) \in I(d)\}$ is denoted by E(d).

For each diagonal d, the labeling system defines a matrix random variable by the following:

$$M_d(x) = [M_d(T'_{d-1}, T_d | x)] \quad (1)$$

where $M_d(x)$ is a $|y|^{s_{d-1}} \times |y|^{s_d}$ matrix for diagonal d for observation x, $s_d$ is the number of states in $T_d$, and $T'_{d-1} = \{y'_{d-2,0}, y'_{d-3,1}, \ldots, y'_{0,d-2}\}$ and $T_d = \{y_{d-1,0}, y_{d-2,1}, \ldots, y_{0,d-1}\}$. Equation 1 is represented by the following:

$$M_d(T'_{d-1}, T_d | x) = \exp(\Lambda_d(T'_{d-1}, T_d | x)) \quad (2)$$

$$\Lambda_d(T'_{d-1}, T_d | x) \sum_{e \in E(d), k} \lambda_k f_k(e, y'_{i',j'}, y_{i,j}, x) + \sum_{v \in I(d), k} \mu_k g_k(v, y_{i,j}, x) \quad (3)$$

where e=((i,j),(i,j)) and v=(i,j) and k is the number of transition feature functions $f_k$ and state feature functions $g_k$, and $\lambda_k$ and $\mu_k$ are the weights for the feature functions. Thus, the labeling system computes the matrices as needed given the observations x and the parameters. The labeling system represents the normalization factor Z(x) as the (start,stop) entry of the product of these matrices:

$$Z(x) = (M_1(x) M_2(x) \ldots M_{M+N}(x))_{(start,stop)} \quad (4)$$

The labeling system calculates the conditional probability label assignments γ given the observations x according to the following equation:

$$p(y | x) = \frac{\prod_{d=1}^{M+N} M_d(T_{d-1}, T_d | x)}{\left(\prod_{d=1}^{M+N} M_d(x)\right)_{(start,stop)}} \quad (5)$$

where $T_d = \{y_{d-1,0}, y_{d-2,1}, \ldots, y_{0,d-1}\}$ ($1 \leq d \leq M+N-1$) and $T_0$=start and $T_{N+M}$=stop.

The labeling system determines weights for the feature functions using the training data $D = \{(y',x')\}_{i=1}^{N}$ with the empirical distribution $\tilde{p}(x,y)$ where N is the number of sets of labeled observations in the training data. The labeling system represents the log-likelihood of $\tilde{p}(x,y)$ with respect to a conditional model $p(y|x,\Theta)$ according to the following:

$$L(\Theta) = \prod_{x,y} \tilde{p}(x, y) \log p(y | x, \Theta) \quad (6)$$

where $\Theta = \{\lambda_1, \lambda_2, \ldots; \mu_1, \mu_s, \ldots\}$ represents the set of weights for the feature functions. The labeling system identifies the weight as the values that optimize the concave log-likelihood function. The labeling system may use various techniques to determine the weights. For example, the labeling system can use techniques used in other maximum-entropy models as described in Lafferty, J., McCallum, A., & Pereira, F., "Conditional Random Fields: Probablistic Models for Segmenting and Labeling Sequence Data," in Proc. ICML, 2001. The labeling system may also use a gradient-based L-BFGS as described in Liu, D. C., & Nocedal, J., "On The Limited Memory BFGS Method for Large Scale Optimization,"

Mathematical Programming 45, pp. 503-528, 1989. The gradient-based model represents each element of the gradient vector as follows:

$$\frac{\partial L(\Theta)}{\partial \lambda_k} = E_{\tilde{p}(x,y)}[f_k] - E_{p(y|x,\Theta)}[f_k] \quad (7)$$

where $E_{\tilde{p}(x,y)}[f_k]$ is the expectation with respect to the empirical distribution and $E_{p(y|x,\Theta)}[f_k]$ is the expectation with respect to the conditional model distribution. The labeling system represents the expectation for feature function $f_k$ as follows:

$$E_{p(y|x,\Theta)}[f_k] = \sum_x \tilde{p}(x) \sum_{e \in E} \sum_{y'_{i',j'}, y_{i,j}} p(y'_{i',j'}, y_{i,j} | x) f_k(e, y'_{i',j'}, y_{i,j}, x) \quad (8)$$

where $e=((i,j),(i,j))$. The labeling system also represents the expectation for feature function $g_k$ as follows:

$$E_{p(y|x,\Theta)}[g_k] = \sum_x \tilde{p}(x) \sum_{v=(i,j) \in V} \sum_{y_{i,j}} p(y_{i,j}|x) g_k(v, y_{i,j}, x) \quad (9)$$

The labeling system calculates the marginal probabilities, which are needed to calculate the gradients at each iteration. The labeling system may use the principles of forward-backward algorithm to reduce computation. As the conditional distribution has the form in equation (2), the state sequence $T_d$ is in fact an "isolating" element in the expansion of $p(y|x)$, which plays the same role as a state at a single unit of time in linear-chain CRFs. The labeling system defines the forward vectors as follows:

$$\alpha_0(T_0|x) = \begin{cases} 1 & \text{if } T_0 = \text{start} \\ 0 & \text{otherwise} \end{cases} \quad (10)$$

$$a_d(x) = a_{d-1}(x) M_d(x)$$

where $a_d(x)$ represents the forward vector for diagonal d=0, . . . ,M+N. The labeling system defines the backward vectors as follows:

$$\beta_{N+M}(T_{M+N}|x) = \begin{cases} 1 & \text{if } T_{M+N} = \text{start} \\ 0 & \text{otherwise} \end{cases} \quad (11)$$

$$\beta_d(x)^T = M_{d+1}(x) \beta_{d+1}(x)$$

where $\beta_d(x)$ represents the backward vector for d=0, . . . ,M+N. The labeling system thus represents the marginal probability of being in state sequence $T_d$ on diagonal d given the observations x as follows:

$$p(T_d|x) = \frac{a_d(T_d|x) \beta_d(T_d|x)}{Z(x)} \quad (12)$$

As a result, the labeling system represents the marginal probability of being at state $y_{i,j}$ at $Y_{i,j}$ on diagonal d as follows:

$$p(y_{i,j}|x) = \sum_{T_d: T_d(i,j) = y_{i,j}} p(T_d|x) \quad (13)$$

Similarly, the labeling system represents the marginal probability of being in state sequence $T'_{d-1}$ on diagonal d-1 and $T_d$ on diagonal d as follows:

$$p(T'_{d-1}, T_d|x) = \frac{a_{d-1}(T'_{d-1}|x) M_d(T'_{d-1}, T_d|x) \beta_d(T_d|x)}{Z(x)} \quad (14)$$

Thus, the marginal probability of being at state $y'_{i',j'}$ at $Y_{i',j'}$ and $y_{i,j}$ at $Y_{i,j}$ is represented as follows:

$$p(y'_{i',j'}, y_{i,j}|x) = \sum_{T'_{d-1}: T'_{d-1}(i',j') = y'_{i',j'}} \sum_{T_d: T_d(i,j) = y_{i,j}} p(T'_{d-1}, T_d|x) \quad (15)$$

where $((i,j),(i,j)) \in E(d)$.

The labeling system determines the labels y* that best describe the observations x according to the following:

$$y^* = \max_y \, p(y(x)) \quad (16)$$

The labeling system uses a dynamic programming technique to determine the labels. A variable-state Viterbi algorithm for two-dimensional Markov models was described in Li, J., Majmi, A., & Gray, R. M., "Image Classification by a Two-Dimensional Hidden Markov Model," IEEE Trans. on Signal Processing, Vol. 48, No. 2. The difference from the normal Viterbi algorithm is that the number of possible state sequences at every position in the Viterbi transition diagram is exponential to the number of states on the diagonal. The labeling system uses the variable-state Viterbi algorithm for the "isolating" element $T_d$. However, as the dimensions of the transition matrices $M_d(x)$ are exponential to the state numbers in $T'_{d-1}$ and $T_d$ respectively, the computational complexity can be very high. To reduce computation, Li proposed a path-constrained suboptimal method. Li chose N most likely state sequences out of all the state sequences based on the assumption that the random variables on a diagonal are statistically independent when the diagonal is separated from others. Based on the same independence assumption, the labeling system uses the path-constrained suboptimal method to compute the approximate gradients for the L-BFGS algorithm to train the model and variable-state Viterbi algorithm to find the best state sequence.

Figure 4:
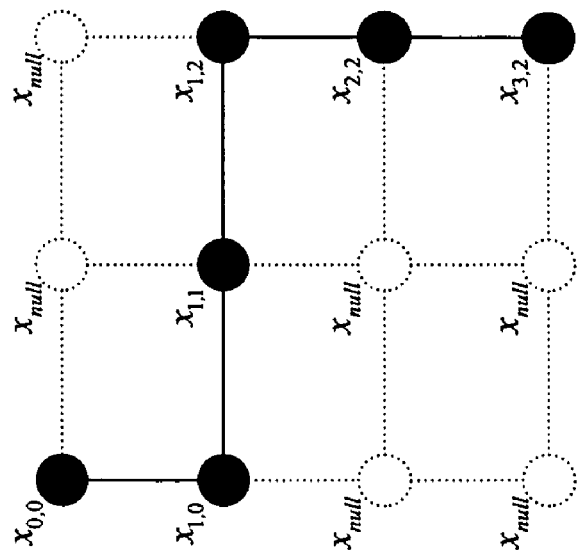
FIG. 4 illustrates the two-dimensionally indexed object block of FIG. 1.
Figure 5:
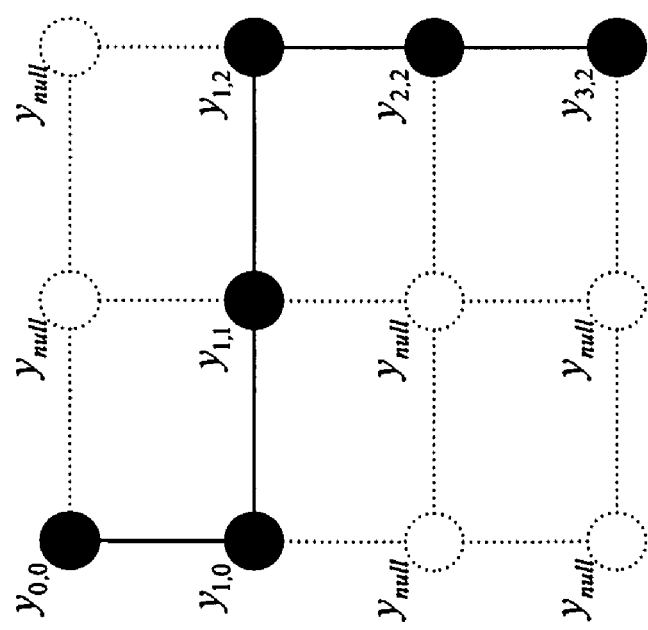
FIG. 5 illustrates the association of each element with only one state in one embodiment.

As described above, an object block comprises some atomic object elements. To extract web information, the labeling system indexes the object elements on a two-dimensional grid according to their position and size information. FIG. 4 illustrates the two-dimensionally indexed object block of FIG. 1. In FIG. 4, $x_{i,j}$ represents the object element at (i,j) and $x_{null}$ represents null elements, that is, object elements that do not exist. In this example, object element 111 is represented by $x_{0,0}$, object element 112 is represented by $x_{1,0}$, object element 113 is represented by $x_{1,1}$, and so on. The labeling system associates each element $x_{i,j}$ with a state $y_{i,j}$ and null element $x_{null}$ with null state $y_{null}$. The labeling system accommodates the irregular neighborhood dependencies caused by the arbitrary sizes of object elements on a web object. For example, the element $x_{1,1}$ is so large that elements $x_{1,2}$, $x_{2,2}$, and $x_{3,2}$ are all its neighbors. FIG. 5 illustrates the association of each element with only one state in one embodiment. To model neighborhood dependencies, the labeling system uses virtual states to avoid further segmenting the atomic extracted object elements into smaller ones. The labeling system denotes the states associated with object elements as real states. The virtual states are mirrors of the real states such that the virtual states and the corresponding real states have the same values when a transition occurs. For each element, the labeling system defines four neighbors (left, top, right, and bottom) as the neighbors of the state with which it is associated. The labeling system represents the four neighbors of element $x_{i,j}$ by a four-tuple $(l_{i,j}, t_{i,j}, r_{i,j}, b_{i,j})$, where $l_{i,j}, t_{i,j}, r_{i,j}$, and $b_{i,j}$ are the coordinates of the left, top, right, and bottom neighbors respectively or null. The labeling system determines the neighbors as follows: If $x_{i,j}$ has only one left, top, right, or bottom neighbor, the corresponding neighbor is that one. If $x_{i,j}$ has more than one left or right neighbor, the left or right neighbor is the highest one. If $x_{i,j}$ has more than one top or bottom neighbor, the top or bottom neighbor is the one farthest to the left. Thus, the neighbors of each element in FIG. 4 are:

$x_{0,0}$:(null,null,null,(1,0))

$x_{1,0}$:(null,(0,0),(1,1),null)

$x_{1,1}$:((1,0),null,(1,2),null)

$x_{1,2}$:((1,1)null,null,(2,2))

$x_{2,2}$:((1,1),(1,2),null,(3,2))

$x_{3,2}$:((1,1),(2,2),null,null)

Figure 6:
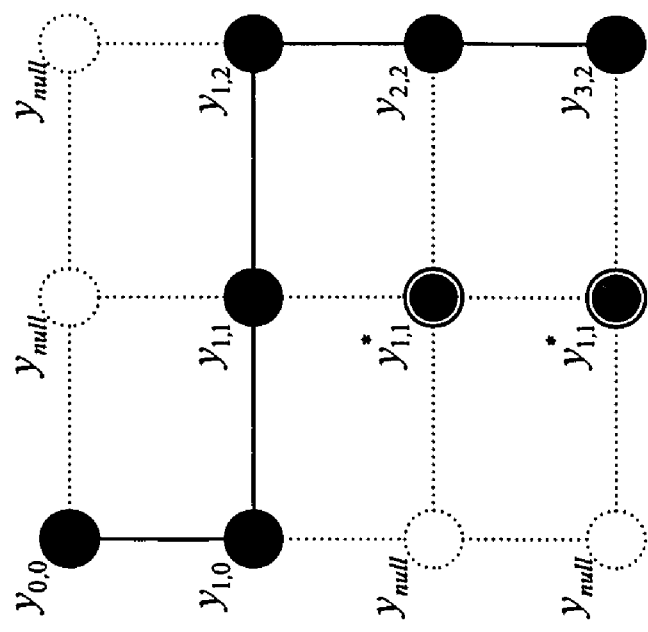
FIG. 6 illustrates virtual states resulting from the associations.

FIG. 6 illustrates virtual states resulting from the associations. Since the labeling system ignores null states during labeling, a diagonal state sequence is composed of the real and virtual states on that diagonal. Thus, the diagonal state sequences in FIG. 6 are:

$T_1$:$\{y_{0,0}\}$ $T_2$:$\{y_{1,0}\}$ $T_3$:$\{y_{1,1}\}$ $T_4$:$\{y^*_{1,1}, y_{1,2}\}$ $T_5$:$\{y^*_{1,1}, y_{2,2}\}$ $T_6$:$\{y_{3,2}\}$ where $y^*_{i,j}$ represents the virtual state of the real state $y_{i,j}$. An edge is a virtual edge if one end is associated with a virtual state and the other end is associated with the same real state, or both ends are associated with the same virtual state. An edge is a real edge if it is not associated with null states. In FIG. 6, real edges are solid and virtual edges are dotted. The labeling system does not factor virtual edges into the probability distribution, but uses the virtual edges to constrain the two states associated with them to have the same state value when a transition occurs. Thus, the labeling system represents Equation 1 as follows:

$$\Lambda_d(T'_{d-1}, T_d \mid x) = \begin{cases} -\infty, & \exists ((i', j'), (i, j)) \in E_v(d) \, s.t. \, y'_{i',j'} \neq y_{i,j} \\ \sum_{e \in E_r(d), k} \lambda_k f_k(e, y'_{i',j'}, y_{i,j}, x) + \sum_{v \in I_r(d), k} \mu_k g_k(v, y_{i,j}, x), & \text{otherwise} \end{cases} \quad (17)$$

where $E_v(d)$ and $E_r(d)$ are the sets of virtual edges and real edges between diagonals $d-1$ and $d$ respectively, $I_r(d)$ is the set of coordinates of the real states on diagonal $d$, and $e=((i, j),(i,j))$, $v=(i, j)$, $v=(i,j)$.

Figure 7:
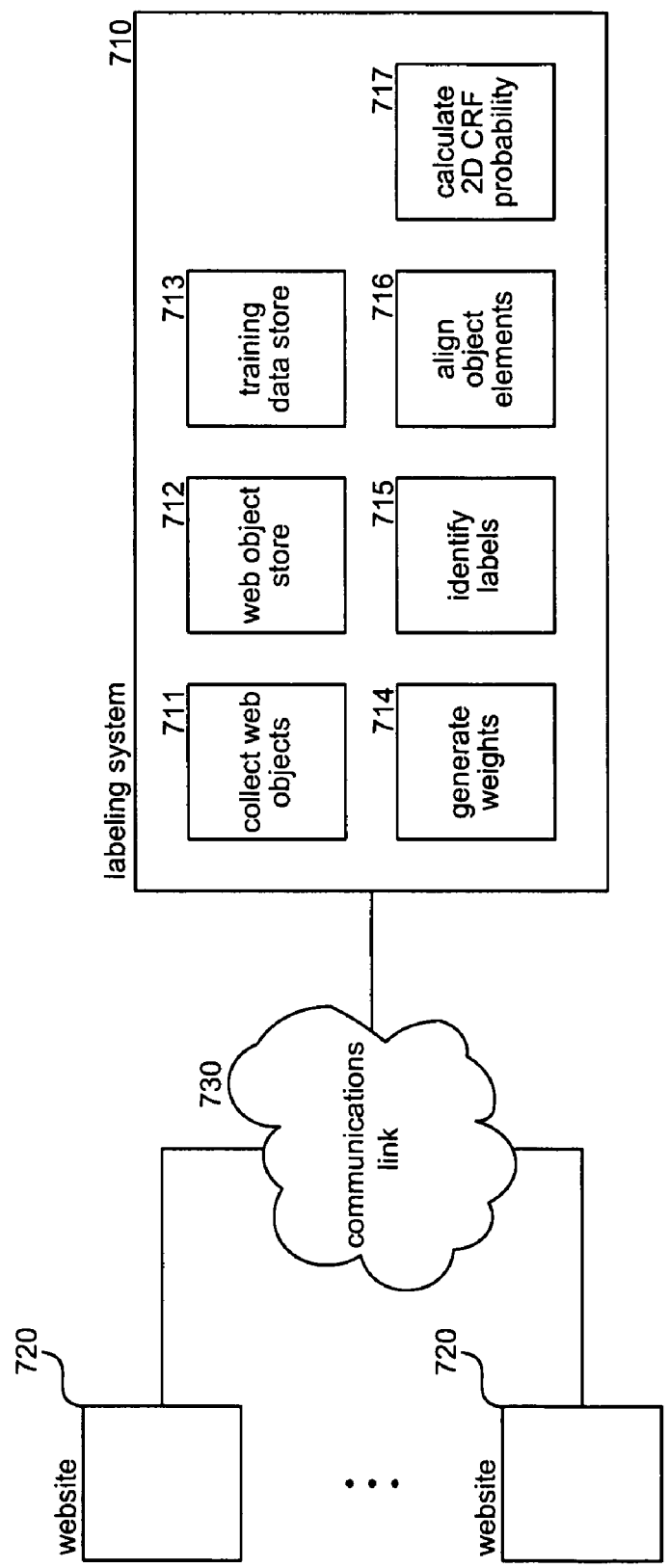
FIG. 7 is a block diagram illustrating components of the labeling system in one embodiment.

FIG. 7 is a block diagram illustrating components of the labeling system in one embodiment. The labeling system 710 is connected to various web sites 720 via a communications link 730. The labeling system includes a collect web objects component 711, a web object store 712, and a training data store 713. The collect web objects component may crawl various web sites to identify web objects and their corresponding object elements. The collect web objects component stores the web objects in the web object store. The training data store contains web objects along with the labels for the object elements. The web objects of the training data may be collected from various web sites and labeled manually or labeled using some other automated technique. The labeling system also includes a generate weights component 714, an identify labels component 715, an align object elements component 716, and a calculate two-dimensional CRF probability component 717. The generate weights component uses the training data to generate the weights for the transition feature functions and the state feature functions of the two-dimensional CRF technique. The identify labels component is passed observations (e.g., the data of the object elements) and applies the two-dimensional CRF technique to identify labels for the object elements. The align object elements component is invoked to align the object elements to the positions of the two-dimensional CRF grid. The calculate two-dimensional CRF probability component is invoked to calculate the probability that a set of labels is the correct labeling using the two-dimensional CRF technique.

The computing devices on which the labeling system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the labeling system. In addition, the data structures and message structures may be stored or transmitted via a data transmission medium, such as a signal on a communications link. Various communications links may be used, such as the Internet, a local area network, a wide area network, or a point-to-point dial-up connection.

The labeling system may be used to monitor configuration in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The labeling system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 8:
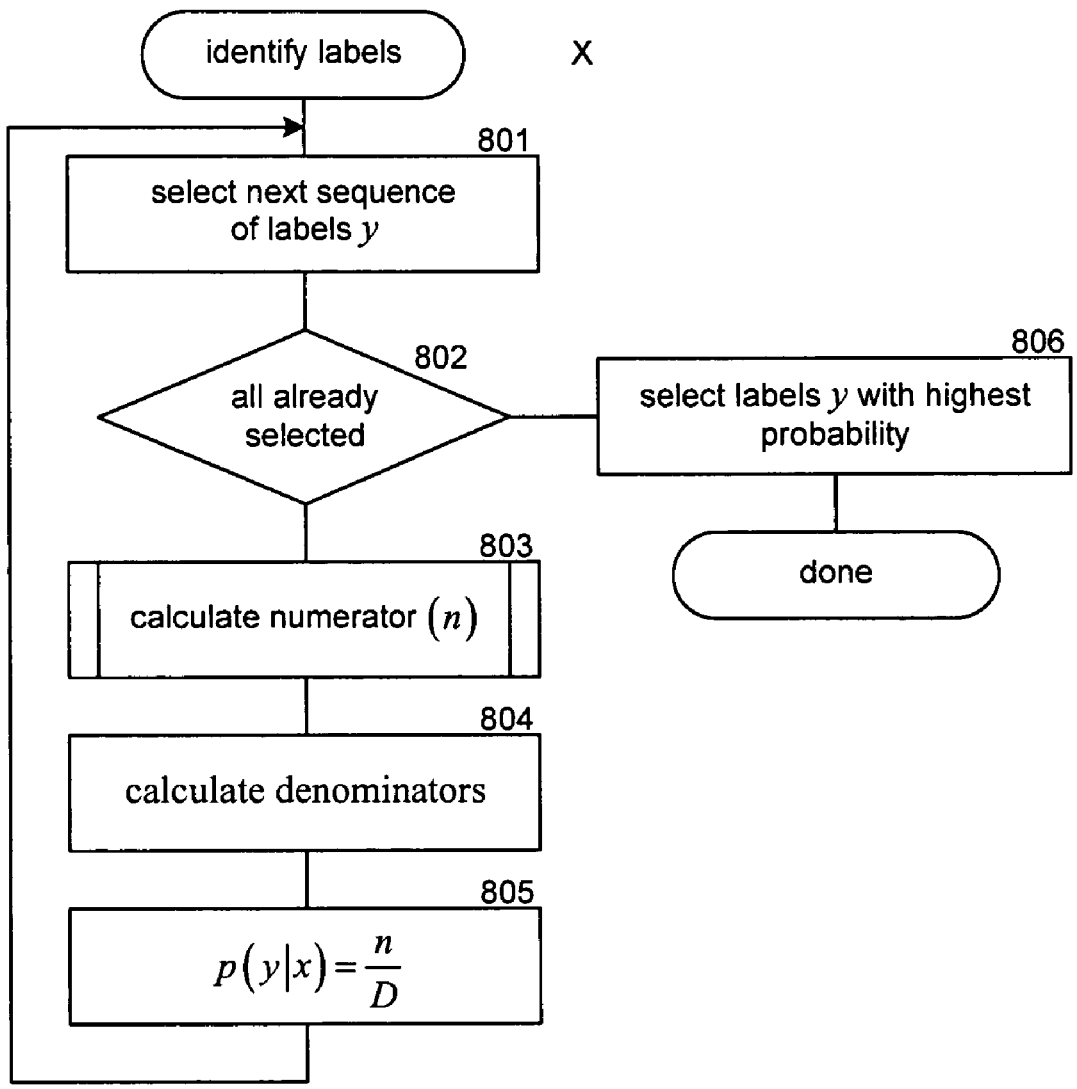
FIG. 8 is a flow diagram that illustrates the processing of the identify labels component of the labeling system in one embodiment.

FIG. 8 is a flow diagram that illustrates the processing of the identify labels component of the labeling system in one embodiment. The component is passed a set of observations that have been aligned to the CRF grid and identifies the set of labels with the highest probability. In one embodiment, this component may be implemented using a variable-state Viterbi algorithm to reduce the computational complexity. In block 801, the component selects the next set of labels. In decision block 802, if all the sets of labels have already been selected, then the component continues at block 806, else the component continues at block 803. In block 803, the component invokes a calculate numerator component to determine the numerator for Equation 17. In block 804, the component calculates the denominator for Equation 17. In block 805, the component calculates the probability and then loops to block 801 to select the next set of labels. In block 806, the component selects the set of labels with the highest probability and then completes.

Figure 9:
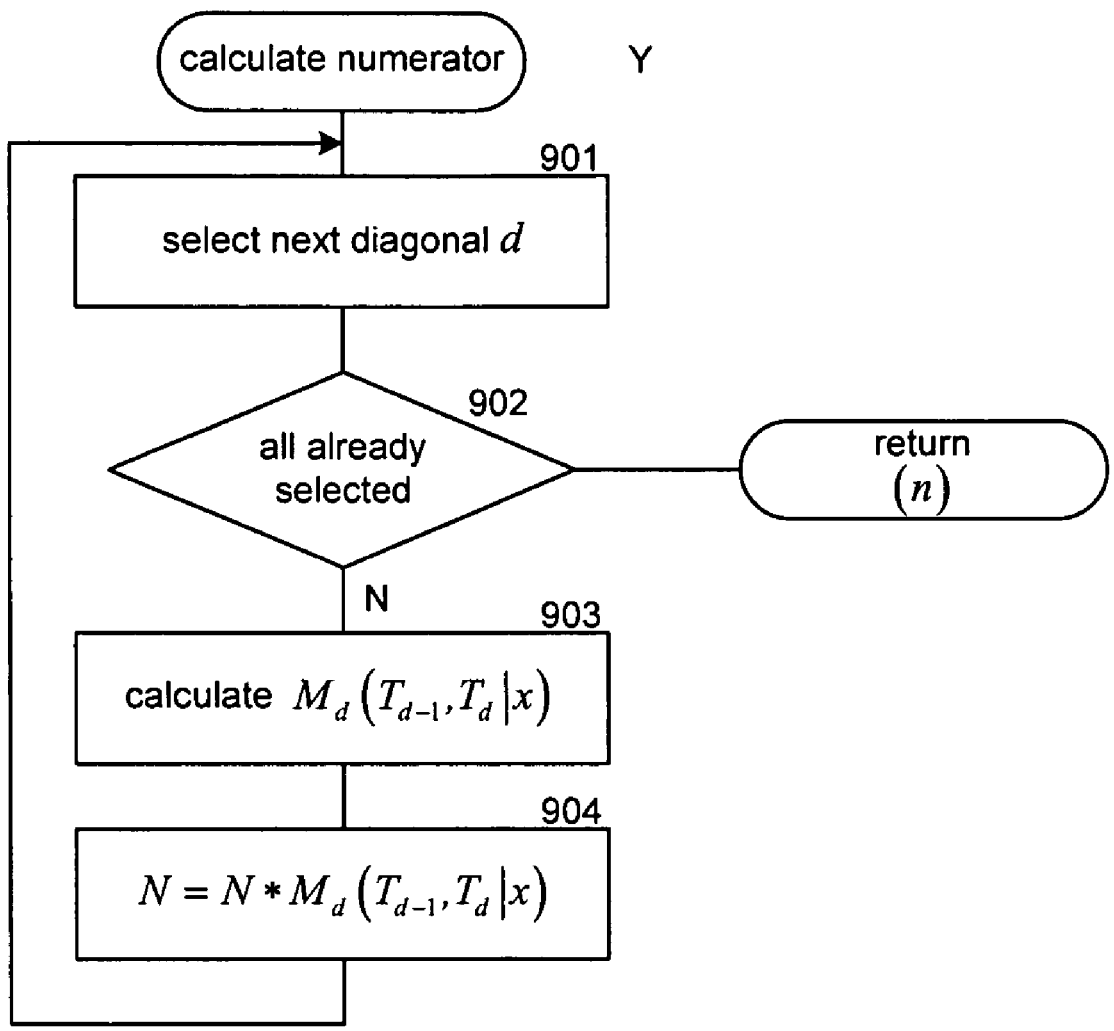
FIG. 9 is a flow diagram that illustrates the processing of the calculate numerator component of the labeling system in one embodiment.

FIG. 9 is a flow diagram that illustrates the processing of the calculate numerator component of the labeling system in one embodiment. The component is passed a set of labels and calculates the numerator for Equation 17. In block 901, the component selects the next diagonal of the CRF grid. In decision block 902, if all the diagonals have already been selected, then the component returns the numerator, else the component continues at block 903. In block 903, the component calculates a matrix of variables for the selected diagonal. In block 904, the component multiplies the matrix variables into the numerator and then loops to block 901 to select the next diagonal.

Figure 10:
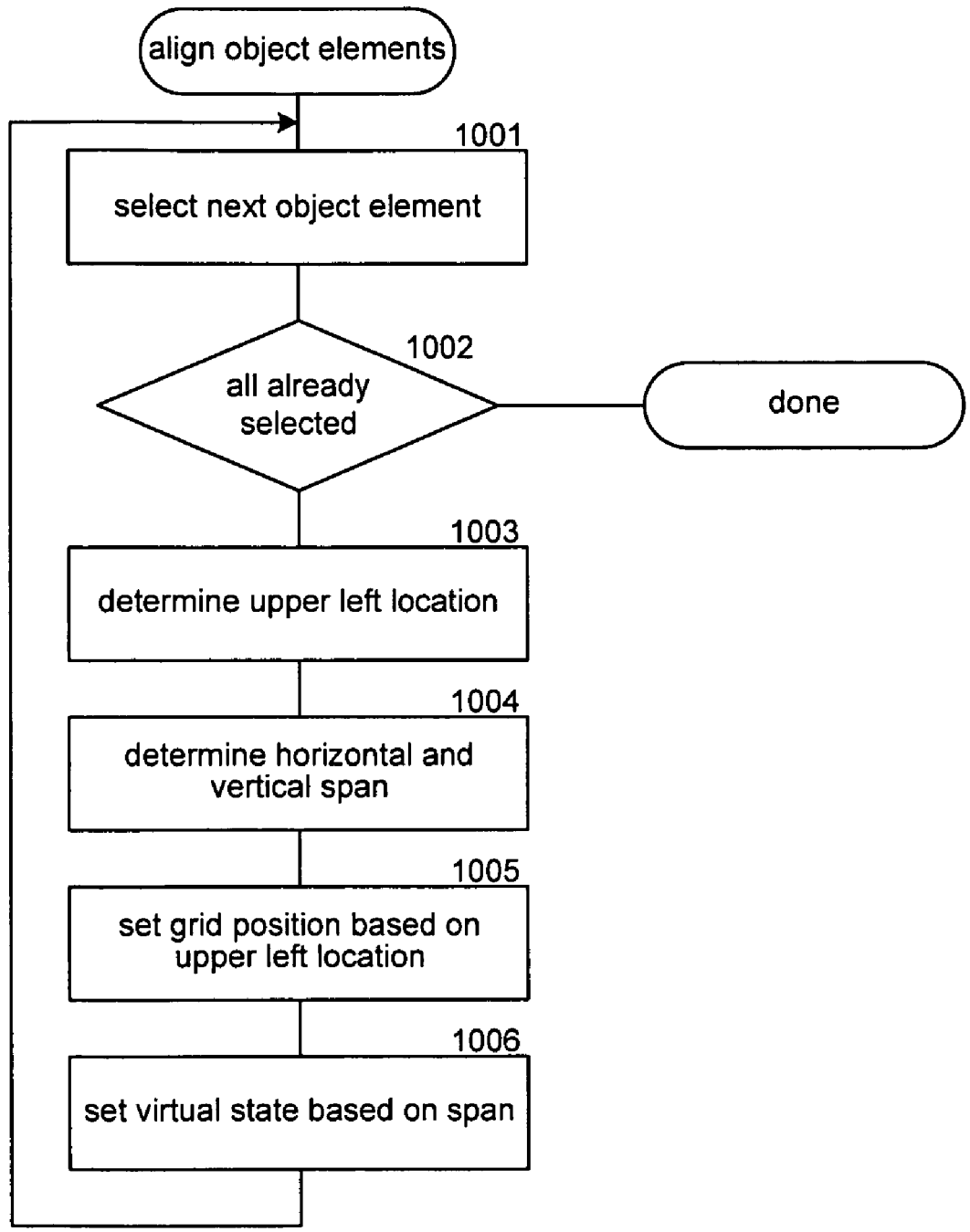
FIG. 10 is a flow diagram that illustrates the processing of the align object elements component of the labeling system in one embodiment.

FIG. 10 is a flow diagram that illustrates the processing of the align object elements component of the labeling system in one embodiment. The component loops aligning the object elements and specifying real states and virtual states. In block 1001, the component selects the next object element. In decision block 1002, if all the object elements have already been selected, then the component completes, else the component continues at block 1003. In block 1003, the component determines the upper left location of the selected object element. In block 1004, the component determines the horizontal and vertical spans of the selected object element. In block 1005, the component sets the grid position based on the upper left location. In block 1006, the component sets the virtual state and real state associated with the selected object element based on its span. The component then loops to block 1001 to select the next object element.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. In particular, the two-dimensional CRF technique may be used to label any type of observations that have a two-dimensional relationship. Accordingly, the invention is not limited except as by the appended claims.

We claim:

1. A method in a computer system with a processor for labeling observations, the observations representing object elements of a web object of a web page, a web object of a web page being a collection of information that relates to a single object, the method comprising:

receiving an identification of a web object of a web page;

dividing by the processor the identified web object into a two-dimensional grid of object elements of the identified web object according to position and size of the object elements based on visual features of the web page, each object element representing an attribute value for the single object;

representing the grid as a graph with vertices and edges, each vertex representing an object element and each edge representing a positional relationship between the object elements;

representing diagonals of the graph as sequences of states; and determining by the processor a labeling for the object elements using a conditional random fields technique that factors in the relationships in two dimensions using the sequences of states representing the diagonals of the graphs;

wherein when an object element represents multiple positions within the grid, representing the object element using a real state at one position and a virtual state at another position within the grid.

2. The method of claim 1 wherein a real state and the corresponding virtual state are constrained to have the same values in a transition.

3. The method of claim 2 including calculating a probability for sets of labels based on transition probabilities between diagonals.

4. A system for identifying object elements of a web object of a web page, the web object representing a product, the system including a central processing unit and further comprising:

a component that identifies a two-dimensional relationship between the object elements of the web object by dividing the web object into a two-dimensional arid of object elements of the web object according to position and size of the object elements based on visual features of the web page, each object element representing an attribute value for the product;

representing the grid as a graph with vertices and edges, each vertex representing an object element and each edge representing a positional relationship between the object elements;

a component that represents diagonals of the graph as sequences of states; and a component that applies a two-dimensional conditional random fields technique to identify a set of labels based on the two-dimensional relationship between the object elements of the web object as represented by the sequences of states representing the diagonals of the graph wherein when an object element represents multiple positions within the grid, representing the object element using a real state at one position and a virtual state at another position within the grid.

5. The system of claim 4 wherein a real state and the corresponding virtual state are constrained to have the same values in a transition.

6. A computer-readable storage medium containing instructions for controlling a computer system to identify object elements of a web object of a web page, the web object representing a product that is being offered for sale, by a method comprising:

representing a two-dimensional relationship between the object elements of the web object as a grid having positions, a position representing a real state or a virtual state, a real state indicating that an object element corresponds to the position and a virtual state indicating that an object element encompasses multiple positions by dividing the web object into a two-dimensional grid of object elements of the web object according to position and size of the object elements based on visual features of the web page, each object element corresponding to an attribute value for the product, an attribute value being text derived from the object element, the dividing including aligning the object elements by, for each object element, determining a upper left location and a horizontal span and a vertical span and setting a grid position based on the upper left location and virtual state based on the spans;

representing the grid as a graph with vertices and edges, each vertex representing an object element and each edge representing a positional relationship between the object elements; and representing each diagonal of the graph as a sequence of states; and applying a two-dimensional conditional random fields technique to identify a set of labels based on the two-dimensional relationship between the object elements of the web object as indicated by diagonals of the grid representing sequences of states.

7. The computer-readable storage medium of claim 6 wherein the applying includes calculating a probability for sets of labels based on transition probabilities between diagonals.

8. The computer-readable storage medium of claim 6 including deriving weights for feature functions based on training data of object elements and labels and wherein the applying calculates a probability for a set of labels based on the derived weights.

9. The computer-readable storage medium of claim 8 wherein the deriving uses a gradient-based L-BFGS technique and the applying uses a variable-state Viterbi technique.

* * * * *

UNITED STATES PATENT AND TRADEMARK OFFICE
CERTIFICATE OF CORRECTION

| | | |
|---|---|---|
| PATENT NO. | : 7,529,761 B2 | Page 1 of 1 |
| APPLICATION NO. | : 11/304500 | |
| DATED | : May 5, 2009 | |
| INVENTOR(S) | : Ji-Rong Wen et al. | |

It is certified that error appears in the above-identified patent and that said Letters Patent is hereby corrected as shown below:

In column 10, line 29, in Claim 1, delete "graphs;" and insert -- graph; --, therefor.

In column 10, line 46, in Claim 4, delete "arid" and insert -- grid --, therefor.

Signed and Sealed this

Eighth Day of February, 2011

David J. Kappos
*Director of the United States Patent and Trademark Office*